United States Patent
Liang et al.

(10) Patent No.: US 7,505,418 B1
(45) Date of Patent: Mar. 17, 2009

(54) NETWORK LOOPBACK USING A VIRTUAL ADDRESS

(75) Inventors: Yong Liang, Bolton, MA (US); Kevin E. Davis, North Reading, MA (US); Ralph Gordon Thompson, III, Manchester, NH (US)

(73) Assignee: Empirix Inc., Bedford, MA (US)

(*) Notice: Subject to any disclaimer, the term of this patent is extended or adjusted under 35 U.S.C. 154(b) by 538 days.

(21) Appl. No.: 10/978,662

(22) Filed: Nov. 1, 2004

(51) Int. Cl.
*H04J 3/14* (2006.01)

(52) U.S. Cl. ................................ 370/249; 370/392
(58) Field of Classification Search ............ None
See application file for complete search history.

(56) References Cited

U.S. PATENT DOCUMENTS

| | | | | |
|---|---|---|---|---|
| 5,710,760 | A * | 1/1998 | Moll | |
| 6,598,144 | B1 * | 7/2003 | Bailey et al. | 711/203 |
| 6,741,585 | B1 * | 5/2004 | Munoz et al. | 370/352 |
| 6,745,333 | B1 * | 6/2004 | Thomsen | |
| 6,788,700 | B1 * | 9/2004 | Nakil | 370/419 |
| 6,798,782 | B1 * | 9/2004 | Caronni et al. | 370/409 |
| 6,873,599 | B1 * | 3/2005 | Han | 370/249 |
| 7,010,595 | B2 * | 3/2006 | Wu | |
| 7,061,870 | B2 * | 6/2006 | Orsatti | 370/241.1 |
| 7,206,288 | B2 * | 4/2007 | Cometto et al. | |
| 7,280,534 | B2 * | 10/2007 | Koppol | 370/352 |
| 7,355,982 | B2 * | 4/2008 | Abe | 370/241.1 |
| 2002/0032766 | A1 * | 3/2002 | Xu | |
| 2003/0115368 | A1 * | 6/2003 | Wu | 709/251 |
| 2003/0223376 | A1 * | 12/2003 | Elliott et al. | |
| 2004/0078462 | A1 * | 4/2004 | Philbrick et al. | 709/224 |
| 2004/0078483 | A1 * | 4/2004 | Simila et al. | 709/238 |
| 2004/0085965 | A1 * | 5/2004 | Fotedar | 370/395.31 |
| 2004/0208129 | A1 * | 10/2004 | Old et al. | 370/241 |
| 2004/0255161 | A1 * | 12/2004 | Cavanaugh | 713/201 |
| 2005/0089014 | A1 * | 4/2005 | Levin et al. | 370/351 |
| 2005/0099951 | A1 * | 5/2005 | Mohan et al. | 370/241 |
| 2005/0259589 | A1 * | 11/2005 | Rozmovits et al. | 370/249 |
| 2006/0045021 | A1 * | 3/2006 | Deragon et al. | 370/249 |
| 2007/0115838 | A1 * | 5/2007 | Dunbar | 370/249 |
| 2007/0160200 | A1 * | 7/2007 | Ishikawa et al. | |
| 2007/0242620 | A1 * | 10/2007 | Zhai | 370/252 |
| 2007/0268896 | A1 * | 11/2007 | Oyama et al. | |
| 2007/0274314 | A1 * | 11/2007 | Werber et al. | |
| 2008/0002663 | A1 * | 1/2008 | Tripathi et al. | |

FOREIGN PATENT DOCUMENTS

JP 2007088770 A * 4/2007

* cited by examiner

*Primary Examiner*—Hassan Kizou
*Assistant Examiner*—Hooman Houshmand
(74) *Attorney, Agent, or Firm*—Chapin IP Law, LLC

(57) ABSTRACT

A method, apparatus and computer program product for performing network loopback using a virtual address includes detecting, in a system, data having a destination address matching an address resident in the system. A virtual destination address, which does not match an address of a device resident within the system and does not match an address of another system connected thereto, is generated. The destination address in the data is replaced with the virtual destination address. A routing table lookup is performed for the data. The virtual destination address is then replaced with the destination address and the data is forwarded to a network interface of the system.

25 Claims, 6 Drawing Sheets

NETWORK LOOPBACK USING A VIRTUAL ADDRESS

BACKGROUND

Certain applications use network communication protocols to exchange data, either between two or more separate components (e.g. a client and a server) or between functions of a single entity (e.g. a transmit function and a receive function). In environments where the network data exchange may be routed internally, not traversing an external network, it may be desirable to ensure that the data exchange does traverse the external network. There can be several reasons why use of the external network is desirable; these reasons may include, but are not limited to, testing of the external network equipment or to allow a network monitoring application to examine the data exchange. In such a scenario, data (e.g., one or more packets) is sent out one network interface of the system, across a network, to a second network interface of the system. It should be noted that some hardware allows for "loopback" to be established on a single network interface wherein data is sent our and received on the same network interface.

In some scenarios, response data may also be sent from the second network interface back to the first network interface. The time it takes the data to traverse the network is measured and quantified. Further, a comparison of the sent and received data may be performed to confirm that the data was not lost, corrupted or otherwise affected.

SUMMARY

Conventional mechanisms such as those explained above suffer from a variety of problems or deficiencies. One such problem is that using conventional loopback on a system having two network interfaces, when data is sent from a first network interface to a second network interface, some operating systems detect that the destination address of the data matches the second network interface IP address, and therefore the data is transferred within the system, and not out on the network. Thus, in certain scenarios, loopback may be ineffective since the data does not traverse a network external to the system.

In order to overcome the above-described scenario, it is necessary to use a second system connected by way of the network to the first system, and to either disable the second network interface and to set the IP address of the network interface of the second system to that of the second network interface of the first system or to remove the second network interface and install it in the second system. In such a manner data is forced to traverse the external network to get to the destination network interface. This is time-consuming and costly, as it requires two systems to perform loopback.

Embodiments of the invention significantly overcome such deficiencies and provide mechanisms and techniques that provide a network loopback driver such that loopback can be performed by way of a single system having multiple network interfaces.

In a particular embodiment of a method for providing network loopback using a virtual IP address, the system detects a command sending data to an IP address of a network interface that is local to the system. A virtual IP address is produced and substituted for the destination IP address of the data. The operating system sees the virtual IP address and determines that the data should be sent out to the network, since the virtual IP address does not correspond to an IP address of a network interface resident within the test system. Before the data is sent out the network, the virtual IP address is replaced with the original destination IP address, so the data traverses the network to get to the other network interface, even though the other network interface is resident with in the system.

Other embodiments include a computer readable medium having computer readable code thereon for providing loopback using a virtual IP address. The computer readable code includes instructions for detecting, in a system, data having a destination address matching an address resident in the system. The medium further includes instructions for generating a virtual address that does not match an address resident within the system or resident with other systems on the network. Instructions for replacing the destination IP address in the data with the virtual address are also included as are instructions for performing a routing table lookup for the data. The medium further includes instructions for replacing the virtual address with the destination address and instructions for forwarding the data to a first network interface of the system.

Still other embodiments include a computerized device, configured to process all the method operations disclosed herein as embodiments of the invention. In such embodiments, the computerized device includes a memory system, a processor, a communications interface, and an interconnection mechanism connecting these components. The memory system is encoded with a process to perform network loopback using a virtual IP address as explained herein that when performed (e.g. when executing) on the processor, operates as explained herein within the computerized device to perform all of the method embodiments and operations explained herein as embodiments of the invention. Thus any computerized device that performs or is programmed to perform the processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Empirix Inc. of Wilmington, Mass.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
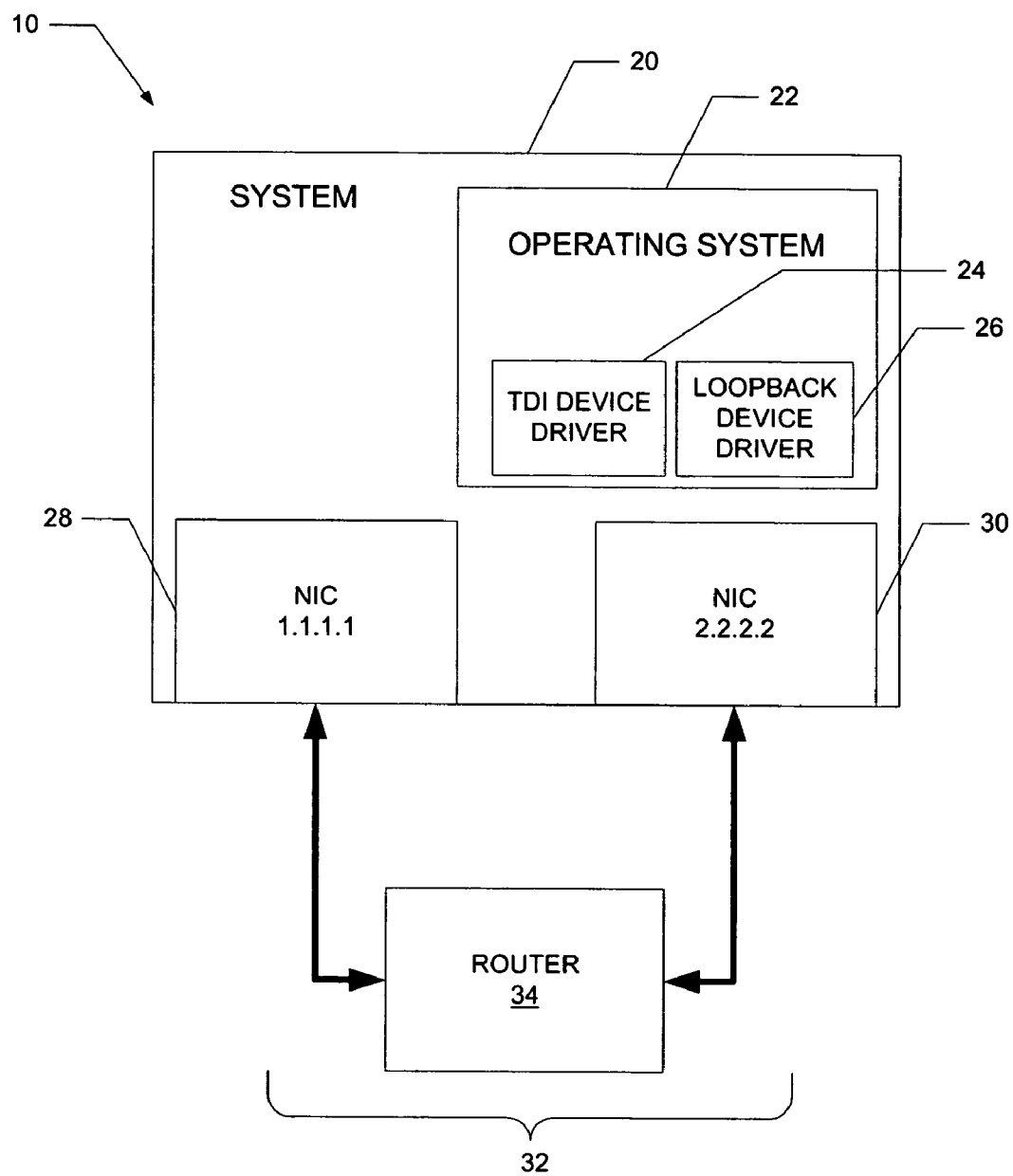
FIG. 1 is a block diagram of a system including a loopback network driver using a virtual address.

Before describing particular embodiments of the invention, it may be helpful to describe some of the terminology used throughout the description.

The standard model for networking protocols and distributed applications is the International Standard Organizations Open System Interconnect (ISO/OSI) model. This model defines seven network layers; a physical layer, data link layer, a network layer, a transport layer, a session layer, a presentation layer and an application layer.

Layer 1 is the physical layer, which defines the cable or physical hardware. Examples include thinnet, thicknet and unshielded twisted pairs (UTP).

Layer 2 is referred to as the data link layer and assigns the format of data on the network. The data link layer handles the physical and logical connections to the data's destination using a network interface. A host connected to an Ethernet would have an Ethernet interface to handle connections to the outside world.

Layer 3 is known as the network layer. The network layer uses the Internet Protocol (IP) as a network layer interface. The Internet protocol identifies each host with a 32-bit IP address. IP addresses are written is four "dot-separated" decimal numbers between 0 and 255. The leading one to three bytes of the IP address identify the network and the remaining bytes identify a particular host on that network.

Layer 4 is the transport layer and is used to provide properly sequenced error-free transmission using Transmission Control Protocol (TCP) or User Datagram Protocol (UDP). TCP establishes connections between two hosts on the network through sockets that are determined by the IP address and the port number. TCP keeps track the data delivery order and which data need to be re-sent. UDP provides a low overhead transmission service with less error checking than TCP.

Layer 5 is the session layer. The session layer protocols define the format of the data sent over the connections. One example of a session layer protocol is the Remote Procedure Call (RPC) protocol.

Layer 6 is the presentation layer. This layer uses External Data Representation (XDR) to convert local representation of data to its canonical form and vice versa. The canonical form uses a standard byte ordering and structure packing convention that is independent of the host.

Layer 7 is the application layer and provides network services to the end users as well as the ability for the user applications to interact with the network.

Internet Protocol (IP) is the method or protocol by which data is sent from one device to another device on the Internet. Each computer on the Internet has at least one IP address that uniquely identifies the computer from other computers on the Internet. When data is sent or received (for example, an e-mail or a Web page), the message may get divided into data. Each of these data contains both the sender's Internet address and the receiver's Internet address. Data is typically sent to a gateway computer that understands a small part of the Internet. The gateway computer reads the destination address and forwards the data to an adjacent gateway that in turn reads the destination address and so forth across the Internet (known as hops) until one gateway recognizes the data as belonging to a computer within its immediate neighborhood or domain. That gateway then forwards the data directly to the computer whose address is specified.

IP is a connectionless protocol, since there is no continuing connection between the end points that are communicating. In the Open Systems Interconnection (OSI)) communication seven layer model (discussed in detail above), IP is in layer 3, the network layer.

The Transport Device Interface (TDI) is a protocol by which a TDI client (e.g. Windows Sockets) talks to network transport device drivers (e.g. Transmission Control Protocol (TCP)/IP). The TDI serves as a boundary layer between networking protocols and upper-layer services.

TCP is one of the main protocols in TCP/IP networks. Whereas the IP protocol deals only with data, TCP enables two hosts to establish a connection and to exchange streams of data. TCP guarantees delivery of data and also guarantees that data will be delivered in the same order in which they were sent. For example, when a file is sent to user from a Web server, the TCP program layer in that server divides the file into one or more data, numbers the data, and then forwards them individually to the IP program layer. Although each data has the same destination IP address, it may get routed differently through the network. At the other end (the client program in the receiving device), TCP reassembles the individual data and waits until they have arrived to forward them as a single file. In the Open Systems Interconnection (OSD communication model, TCP is in layer 4, the transport layer.

Address Resolution Protocol (ARP) is a network layer protocol used to convert an IP Address into a physical address (such as an Ethernet address). A host wishing to obtain a physical address broadcasts an ARP request onto the TCP/IP network. The host on the network that has the IP address in the request then replies with its physical hardware address. For example, in IP Version 4 an address is 32 bits long. In an Ethernet local area network, however, addresses for attached devices are 48 bits long. The physical machine address is also known as a Media Access Control (MAC) address. A table, usually called the ARP cache, is used to maintain a correlation between each MAC address and its corresponding IP address.

ARP provides the protocol rules for making this correlation and providing address conversion in both directions.

When an incoming data destined for a host machine on a particular local area network arrives at a gateway, the gateway asks the ARP program to find a physical host or MAC address that matches the IP address. The ARP program looks in the ARP cache and, if it finds the address, provides it so that the data can be converted to the right data length and format and sent to the machine. If no entry is found for the IP address, ARP broadcasts a request data in a special format to all the machines on the LAN to see if one machine knows that it has that IP address associated with it. A machine that recognizes the IP addresses as its own returns a reply so indicating. ARP updates the ARP cache for future reference and then sends the data to the MAC address that replied.

NDIS (Network Driver Interface Specification) is a specification defining how communication protocol programs (such as TCP/IP) and network device drivers communicate with each other. NDIS specifies interfaces for a protocol stack that is the program that sends and receives data by constructing or extracting it from the formatted units. This program generally corresponds to layers 3 and 4 (the network layer and the transport layer) of the OSI reference model.

NDIS specifies interfaces for device drivers that interact directly with the network interface card (NIC) or other adapter hardware, which sends or receives the data on the communications line in the form of electronic signals. The driver program and the NIC interact at the Media Access Control (MAC address) sublayer of the layer 2 level of the OSI reference model, the data link layer. NDIS also specifies interfaces for a program called the Protocol Manager that assists the protocol stack program and the MAC driver program by telling each of them the computer location of the other when the operating system is started or, in some cases, when a new device is added to the computer.

Referring now to FIG. 1, a particular embodiment of an environment 10 for performing network loopback using a virtual address is shown. The environment includes a system 20 having an operating system 22 installed. The operating system 22 includes a TDI driver 24 and a loopback device driver 26, described in detail below.

The system 20 further includes a first NIC 28 and a second NIC 30. NIC 28 has an IP address (e.g., 1.1.1.1) and NIC 30 has an IP address (e.g., 2.2.2.2) that is different from the IP address of NIC 28. Both NICs 28 and 30 are in communication with a network 32. Network 32 may further include a router 34.

In order to perform loopback data is sent from one NIC, across the network, where it is received by the other NIC. In the environment 10, data may be sent from NIC 28 (the source) to NIC 30 (the destination) across network 32. Reply data may also be sent from NIC 30, across network 32, back to NIC 28.

Figure 2:
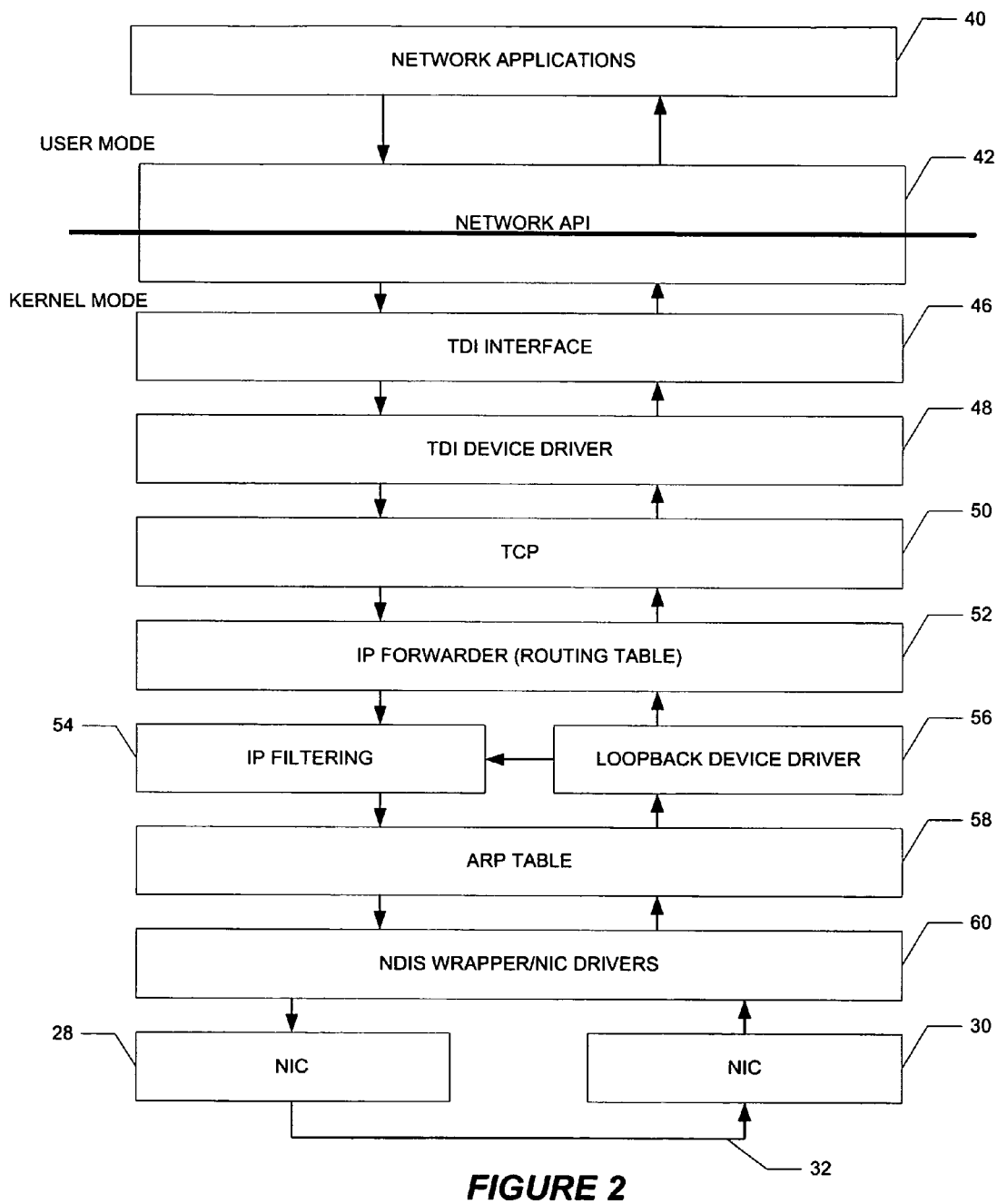
FIG. 2 comprises a block diagram of the layers, applications and protocols used to provide network loopback using a virtual address.

Referring now to FIG. 2, the different layers, interfaces and protocols involved in providing network loopback using a virtual IP address are shown.

Network applications 40 comprise an application layer (layer 7) interface that allows applications to communicate over a network. The command from the software performing the network loopback includes instructions for sending data out onto a network.

Network API 42, for example Windows sockets (referred to as Winsock), is a common interface between Internet applications and the internal system network software. Network API 42 unbundles the low level network programming from the high-level application programming.

The Transport Driver Interface (TDI) 46 defines a kernel-mode network interface that is exposed at the upper edge of transport protocol stacks. The TDI 46 resides in layer 5.

Transport drivers 48 are used by TDI clients. The emulator module maps the native function and its associated parameters and procedural rules to one or more TDI functions, and then calls the indicated transport driver 48 through the TDI 46.

TCP 50 (described above) enables two hosts to establish a connection and to exchange streams of data. TCP guarantees delivery of data and also guarantees that data will be delivered in the same order in which they were sent.

IP forwarder (routing table) 52 is used to forward data that are to a destination other than this system to the next hop system provided that there is a valid routing table entry for the destination system. The ip_forward routine within IP forwarder 52 consults the routing table to find the next hop for this destination and transmits the data to that system.

IP filtering element 54 enables control of access to a specific account by allowing or denying access according to an IP address. IP filtering element 54 is in communication with loopback device driver 56. The loopback device driver 56 verifies that it is possible to send and receive data up and down the stack.

ARP table 58 is used to maintain a correlation between each MAC address and its corresponding IP address. ARP provides the protocol rules for making this correlation and providing address conversion in both directions.

NDIS wrappers/NIC drivers 60 reside at layer 2 of the OSI model. As described above, the NDIS specifies interfaces for the device drivers for the NIC(s). The NIC drivers are used to control and manage the NICs 28 and 30.

In operation, an application that includes instructions for performing network loopback sends a command to send data from NIC 28 to NIC 30 over network 32. The instruction is forwarded from the Network Applications 40 to the Network API 42, which is resident within the user mode of the operating system. In this example the data includes a source address of 1.1.1.1 (the IP address of NIC 28) and a destination address of 2.2.2.2 (the IP address of NIC 30).

The data is then afforded to Transport Driver Interface (TDI) 46. The TDI comprises a kernel-mode network interface.

The data is then forwarded to TDI Device Driver 48. The TDI device driver analyzes the data and determines that the destination address of the data is resident within the system. Conventional processing would result in the data not being forwarded within the system to NIC 28 since the destination address is resident within the system, however, in order to provide loopback which includes these types of data, the TDI Device Driver of the present invention replaces the destination address of the data with a virtual destination address that is not resident within the system or within other systems connected to this system. In this example the destination address is changed from 2.2.2.2 to 1.1.1.2. In order to provide a virtual destination address, the device driver accesses the Routing Table and ARP to determine an address for the data that will result in the data being sent out onto the network 32.

The data (now having the virtual destination address of 1.1.1.2) is provided to TCP 50 and from TCP 50 to IP Forwarder 52. The IP forwarder 52 determines that the data includes a destination address that is not resident in the system and provides the mechanism for forwarding the data to the next hop system based on the routing table entry for the destination address.

The data is provided to the IP filtering process 54 and also to loopback device driver 56. The loopback device driver 56 converts the destination address from the virtual destination address (1.1.1.2) back to the original destination address (2.2.2.2). This is necessary in order for the data to be routed to the proper destination NIC 30.

The data, now with the original destination address restored, is provided to ARP table 58. As discussed above, the ARP table 58 maintains a correlation between each MAC address and its corresponding IP address.

The data is then presented to the network interface drivers 60 and directed to the first network interface 28 where it will be sent out to the network 32, and will be received at NIC 30.

In such a manner, by way of substituting a virtual destination address which is not resident within the system with the destination address which is resident within the system, the data is sent out onto the network and effective network loopback is performed.

A similar process, only in reverse order, occurs when the data is received. The data with the original destination address and the original source address is received at NIC 30. The received data includes a destination address of 2.2.2.2 (the IP address of NIC 30) and a source address of 1.1.1.1 (the IP address of NIC 28).

The received data is provided to ARP table 58. As discussed above, the ARP table 58 maintains a correlation between each MAC address and its corresponding IP address.

The data is then provided to the loopback device driver 56. In some instances it is necessary for the loopback device driver 56 to convert the source address to a virtual source address. This is the case when TCP is used, since in TCP a real connection is established between the sender and receiver. As a result, the receiver will attempt to reply to the virtual source address. Accordingly, when TCP is used, the loopback device driver 56 will convert the source address of 1.1.1.1 to a virtual source address of 2.2.2.3. In other instances it is not necessary for the loopback device driver 56 to convert the source address to a virtual source address (e.g. when UDP is used).

The data (which may now have a source address of 2.2.2.3) is provided to the IP forwarder 52 and from IP Forwarder 52 to TCP 50.

The received data is forwarded to TDI Device Driver 48. The TDI device driver of the present invention replaces the virtual source address of the data with the original source address when the data had been previously replaced with a virtual source address. In this example the source address will be changed from 2.2.2.3 to 1.1.1.1. The data is then processed in a conventional manner by the TDI interface 46, Network API 42 and the network application 40.

In such a manner, by way of utilizing a virtual IP address that is not resident within the system, the data is sent out onto the network and received from the network such that effective network loopback is performed.

Figure 3A:
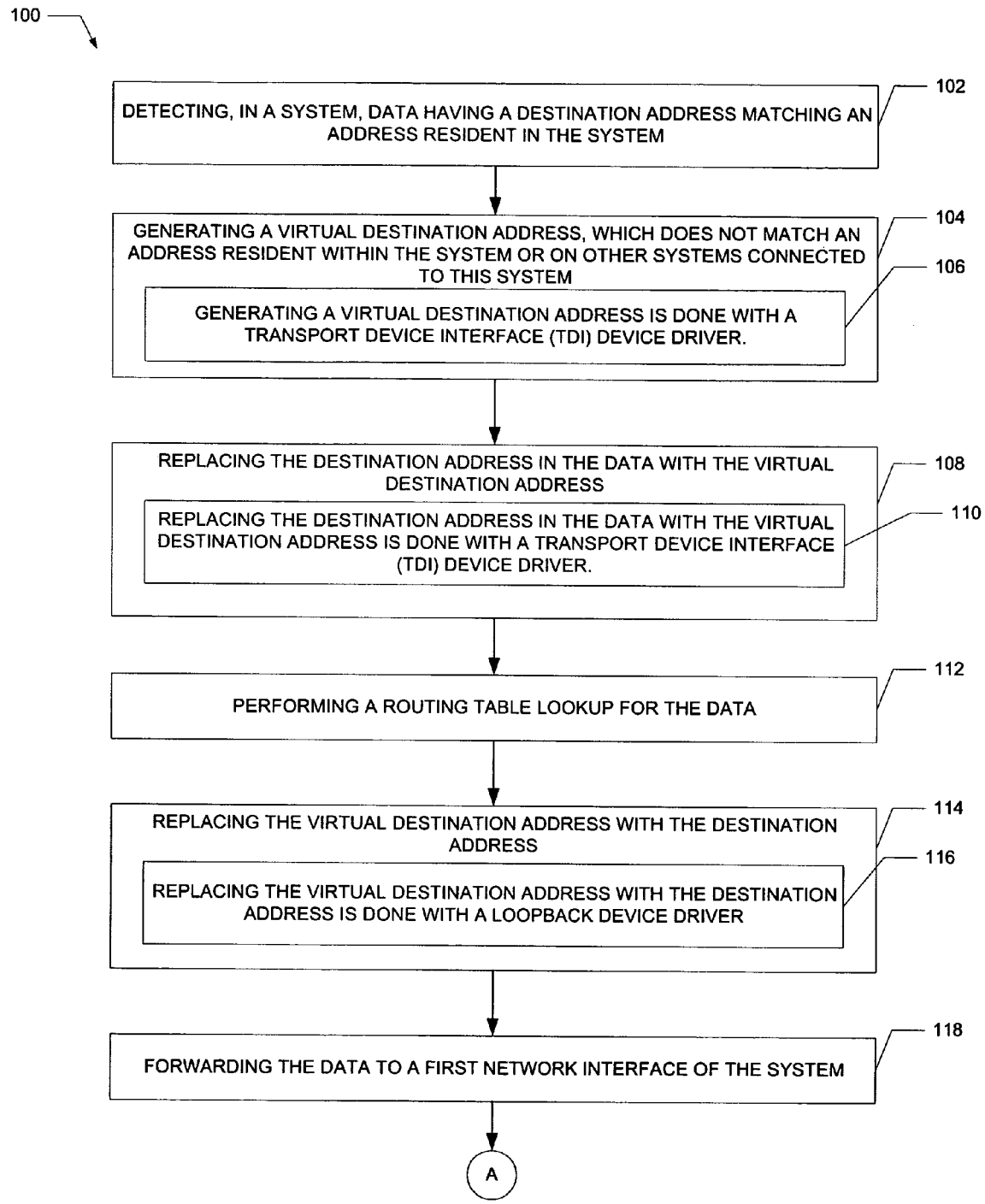
FIGS. 3A and 3B comprises a flow diagram of a first method of providing a loopback network driver using a virtual address.
Figure 3B:
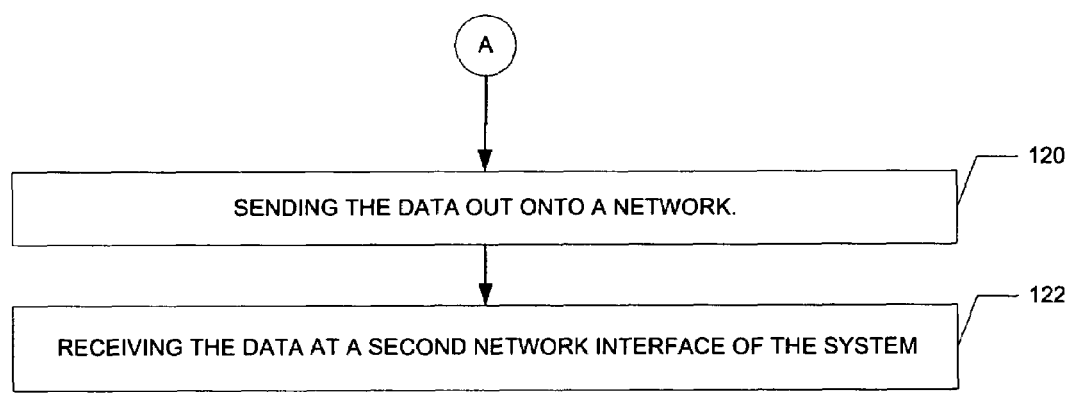
Figure 4:
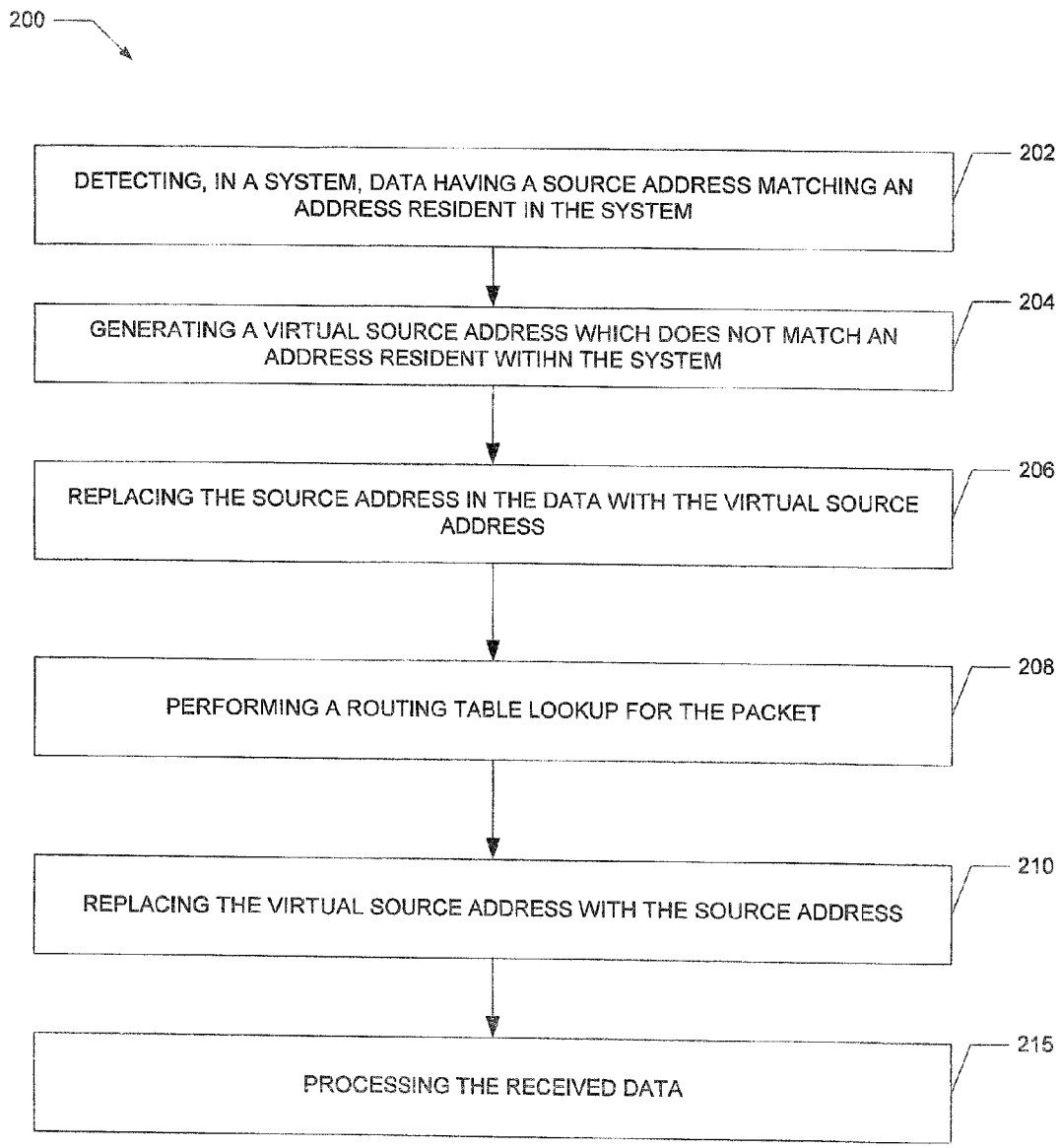
FIG. 4 comprises a flow diagram of a second method of providing a loopback network drive using a virtual address.

A flow chart of the presently disclosed method is depicted in FIGS. 3A-3B and FIG. 4. The rectangular elements are herein denoted "processing blocks" and represent computer software instructions or groups of instructions. The diamond shaped elements, are herein denoted "decision blocks," represent computer software instructions, or groups of instructions which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIGS. 3A-3B, a method 100 of performing network loopback using a virtual IP address is shown. The method 100 starts with processing block 102 which recites detecting, in a system, data having a destination address matching an address resident in the system.

Processing block 104 discloses generating a virtual destination address which does not match an address resident within the system or resident within other systems connected to this system. In order to provide a virtual destination address, the device driver accesses the Routing Table and ARP to determine an address for the data that will result in the data being sent out onto the network.

Processing block 108 states replacing the destination address in the data with the virtual destination address. This is performed by the TDI device driver, as shown in processing block 110.

Performing a routing table lookup for the data is described in processing block 112. The routing table lookup determines the destination address is not resident within the system and starts the mechanism for forwarding the data out of the system and onto the network.

Processing block 114 recites replacing the virtual destination address with the destination address. This is accomplished by the loopback device driver (as shown in processing block 116), and results in the data being routed to the proper destination network interface.

Processing block 118 discloses forwarding the data to a first network interface of the system, and at processing block 120 the data is sent out onto a network.

Processing block 122 states receiving the data at a second network interface of the system. Accordingly, the data has been transmitted across the network from the first network interface to a second network interface residing in the same system.

Referring now to FIG. 4, when TCP is used, receiving the data requires additional processing. The method of receiving data begins with processing block 202 which states detecting, in a system, data having a source address matching an address of a device resident in the system;

Processing block 204 recites generating a virtual source address, which does not match an address resident within the system or resident within other systems connected to this system. In order to provide a virtual source address, the loopback device driver accesses the Routing Table and ARP to determine an address for the data that will result in a reply data being sent out onto the network.

Processing block 206 states replacing the source address in the data with a virtual source address. In order to provide a virtual source address, the loopback device driver accesses the Routing Table and ARP to determine an address for the data that will result in the reply data being sent out onto the network.

At processing block 208 a routing table lookup is performed for the data. The routing table lookup determines the source address is not resident within the system and starts the mechanism for forwarding the reply data out of the system and onto the network.

Processing block 210 recites replacing the virtual source address with the source address. This is accomplished by the loopback device driver.

Processing block 215 discloses processing the received data which now has the original source address.

Figure 5:
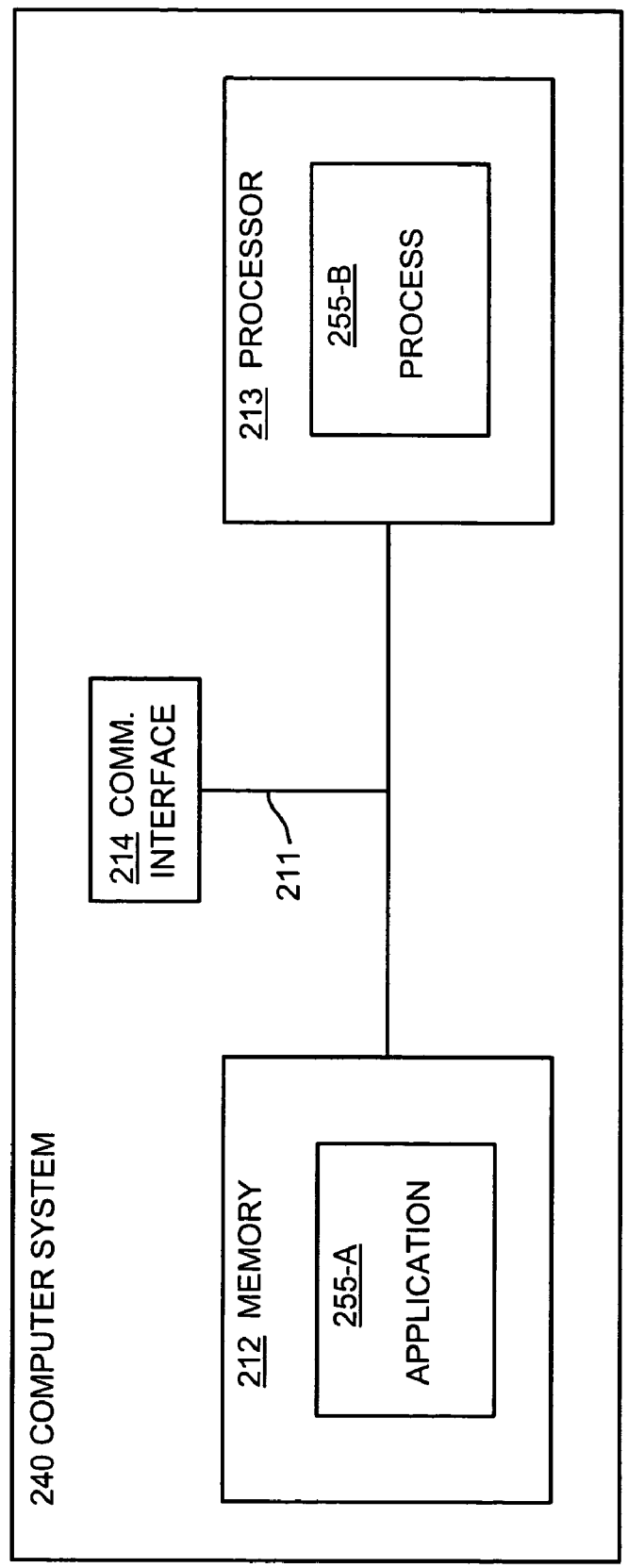
FIG. 5 is a block diagram of a system for performing network loopback using a virtual address.

Referring now to FIG. 5, an example architecture of a computer system that is configured to provide network loopback using a virtual address is shown. The computer system 240 may be any type of computerized system such as a personal computer, workstation, portable computing device, mainframe, server or the like. In this example, the system includes an interconnection mechanism 211 that couples a memory system 212, a processor 213, and a communications interface 214. The communications interface 214 allows the computer system 240 to communicate with external devices or systems.

The memory system 212 may be any type of computer readable medium that is encoded with an application 255-A that represents software code such as data and/or logic instructions (e.g., stored in the memory or on another computer readable medium such as a disk) that embody the processing functionality of embodiments of the invention as explained above. The processor 213 can access the memory system 212 via the interconnection mechanism 211 in order to launch, run, execute, interpret or otherwise perform the logic instructions of the applications 255-A for the host in order to produce a corresponding process 255-B. In other words, the process 255-B represents one or more portions of the application 255-A performing within or upon the processor 213 in the computer system. It is to be understood that the agent 255 operates as explained in former examples are represented in FIG. 5 by the application 255-A and/or the process 255-B.

It is to be understood that embodiments of the invention include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 212 (e.g., within random access memory or RAM). It is also to be understood that other embodiments of the invention can provide the applications operating within the processor 213 as the processes. While not shown in this example, those skilled in the art will understand that the computer system may include other processes and/or software and hardware components, such as an operating system, which have been left out of this illustration for ease of description of the invention.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. Accordingly, it is submitted that that the invention should not be limited to the described embodiments but rather should be limited only by the spirit and scope of the appended claims.

What is claimed is:

1. A method of performing loopback, the method comprising:

detecting, in a system, data having a destination address matching an address resident in the system;

generating a virtual destination address which does not match an address of a device resident within the system and does not match an address of another system connected to said system;

replacing the destination address in the data with said virtual destination address;

performing a routing table lookup for said data;

replacing said virtual destination address with said destination address; and forwarding said data to a first network interface of the system.

2. The method of claim 1 further comprising sending said data out onto a network.

3. The method of claim 2 further comprising receiving said data at a second network interface of said system.

4. The method of claim 3 wherein said receiving comprises:

detecting, in a system, data having a source address matching an address of a device resident in the system;

generating a virtual source address, which does not match an address resident within the system;

replacing the source address in the data with said virtual source address;

performing a routing table lookup for said data;

replacing said virtual source address with said source address; and processing said received data.

5. The method claim 1 wherein said generating a virtual destination address is done with a Transport Device Interface (TDI).

6. The method of claim 1 wherein said replacing the destination address in the data with said virtual destination address is done with a Transport Device Interface (TDI).

7. The method of claim 1 wherein said replacing said virtual destination address with said destination address is done with a loopback device driver.

8. The method claim 4 wherein said generating a virtual source address is done with a loopback device driver.

9. The method of claim 4 wherein said replacing the source address in the data with said virtual source address is done with a loopback device driver.

10. The method of claim 4 wherein said replacing said virtual source address with said source address is done with a transport device interface.

11. A method of performing loopback, the method comprising:

detecting, in a system, data having a destination address matching an address resident in the system;

generating a virtual destination address which does not match an address of a device resident within the system and does not match an address of another system connected to said system, said generating done with a transport device interface;

replacing the destination address in the data with said virtual destination address with said transport device driver;

performing a routing table lookup for said data;

replacing said virtual destination address with said destination address with a loopback device driver;

forwarding said data to a first network interface of the system;

sending said data out onto a network; and receiving said data at a second network interface of said system.

12. The method of claim 11 wherein said receiving comprises:

detecting, in a system, data having a source address matching an address of a device resident in the system;
generating a virtual source address which does not match an address resident within the system and does not match an address of another system connected to said system, said generating done with said loopback device driver;
replacing the source address in the data with said virtual source address with said loopback device driver;
performing a routing table lookup for said data;
replacing said virtual source address with said source address with said transport device interface; and
processing said received data.

13. A computer readable medium having computer readable code thereon for providing loopback using a virtual address, the medium comprising:
instructions for detecting, in a system, data having a destination address matching an address resident in the system;
instructions for generating a virtual destination address, which does not match an address of a device resident within the system and does not match an address of another system connected to said system;
instructions for replacing the destination address in the data with said virtual destination address;
instructions for performing a routing table lookup for said data;
instructions for replacing said virtual destination address with said destination address; and
instructions for forwarding said data to a first network interface of the system.

14. The computer readable medium of claim 13 further comprising:
instructions for sending said data out onto a network; and
instructions for receiving said data at a second network interface of said system.

15. The computer readable medium of claim 14 wherein said instructions for receiving said data further comprise:
instructions for detecting, in a system, data having a destination address matching an address resident in the system;
instructions for generating a virtual source address, which does not match an address of a device resident within the system and does not match an address of another system connected to said system;
instructions for replacing the source address in the data with said virtual source address;
instructions for performing a routing table lookup for said data;
instructions for replacing said virtual source address with said source address of said data; and
instructions for processing said data.

16. The computer readable medium of claim 15 wherein said instructions for generating a virtual destination address and said instructions for generating a virtual source address comprises instructions for generating an address that does not match an address of a device resident in said system and does not match an address of another system connected to said system, does not match an address resident in a routing table of said system and does not match an address resident in an Address Resolution Protocol (ARP) table of said system.

17. A computer readable medium having computer readable code thereon for providing loopback using a virtual address, the medium comprising:
instructions for detecting, in a system, data having a destination address matching an address resident in the system;
instructions for generating, with a transport device interface, a virtual destination address which does not match an address of a device resident within the system and does not match an address of another system connected to said system;
instructions for replacing the destination address in the data with said virtual destination address with said transport device driver;
instructions for performing a routing table lookup for said data;
instructions for replacing said virtual destination address with said destination address with a loopback device driver;
instructions for forwarding said data to a first network interface of the system;
instructions for sending said data out onto a network; and
instructions for receiving said data at a second network interface of said system.

18. The computer readable medium of claim 17 wherein said instructions for receiving comprises:
instructions for detecting, in a system, data having a source address matching an address of a device resident in the system;
instructions for generating, with said loopback device driver, a virtual source address which does not match an address resident within the system and does not match an address of another system connected to said system;
instructions for replacing the source address in the data with said virtual source address with said loopback device driver;
instructions for performing a routing table lookup for said data;
instructions for replacing said virtual source address with said source address with said transport device interface; and
instructions for processing said received data.

19. A computer system comprising:
a memory;
a processor;
a communications interface;
an interconnection mechanism coupling the memory, the processor and the communications interface; and
wherein the memory is encoded with an application that when performed on the processor, provides a process for processing information, the process causing the computer system to perform the operations of:
detecting, in a system, data having a destination address matching an address resident in the system;
generating a virtual destination address, which does not match an address of a device resident within the system and does not match an address of another system connected to said system;
replacing the destination address in the data with said virtual destination address;
performing a routing table lookup for said data;
replacing said virtual destination address with said destination address; and
forwarding said data to a first network interface of the system.

20. The computer system of claim 19 wherein the process causing the computer system to perform the operations further comprises sending said data out onto a network.

21. The computer system of claim 20 wherein the process causing the computer system to perform the operations further comprises receiving said data at a second network interface of said system.

22. The computer system of claim 19 wherein the process causing the computer system to perform the operations further comprises:
- detecting, in a system, data having a source address matching an address of a device resident in the system;
- generating a virtual source address, which does not match an address resident within the system and does not match an address of another system connected to said system;
- replacing the source address in the data with said virtual source address;
- performing a routing table lookup for said data;
- replacing said virtual source address with said source address; and
- processing said received data.

23. The computer system of claim 22 wherein the process causing the computer system to perform the operations further comprises:
- generating a virtual address and generating a second virtual address wherein the virtual address and the second virtual address do not match an address resident in said system and does not match an address of another system connected to said system, does not match an address resident in a routing table of said system and does not match an address resident in an Address Resolution Protocol (ARP) table of said system.

24. A computer system comprising:
- a memory;
- a processor;
- a communications interface;
- an interconnection mechanism coupling the memory, the processor and the communications interface; and
- wherein the memory is encoded with an application that when performed on the processor, provides a process for processing information, the process causing the computer system to perform the operations of:
- detecting, in a system, data having a destination address matching an address resident in the system;
- generating, with a transport device interface, a virtual destination address which does not match an address of a device resident within the system and does not match an address of another system connected to said system;
- replacing the destination address in the data with said virtual destination address with said transport device driver;
- performing a routing table lookup for said data;
- replacing said virtual destination address with said destination address with a loopback device driver;
- forwarding said data to a first network interface of the system;
- sending said data out onto a network; and
- receiving said data at a second network interface of said system.

25. The computer system of claim 24 wherein said receiving comprises:
- detecting, in a system, data having a source address matching an address of a device resident in the system;
- generating, with said loopback device driver, a virtual source address which does not match an address resident within the system and does not match an address of another system connected to said system;
- replacing the source address in the data with said virtual source address with said loopback device driver;
- performing a routing table lookup for said data;
- replacing said virtual source address with said source address with said transport device interface; and
- processing said received data.

* * * * *

UNITED STATES PATENT AND TRADEMARK OFFICE
CERTIFICATE OF CORRECTION

PATENT NO. : 7,505,418 B1  Page 1 of 2
APPLICATION NO. : 10/978662
DATED : March 17, 2009
INVENTOR(S) : Liang et al.

It is certified that error appears in the above-identified patent and that said Letters Patent is hereby corrected as shown below:

On cover page, item (56), under "U.S. Patent Documents", in column 1, line 1, after "Moll" insert -- 370/249 --.

On cover page, item (56), under "U.S. Patent Documents", in column 1, line 4, after "Thomsen" insert -- 726/23 --.

On cover page, item (56), under "U.S. Patent Documents", in column 1, line 8, after "Wu" insert -- 709/224 --.

On cover page, item (56), under "U.S. Patent Documents", in column 1, line 10, after "Cosmetto et al." insert -- 370/249 --.

On cover page, item (56), under "U.S. Patent Documents", in column 1, line 13, after "Xu" insert -- 709/223 --.

On cover page, item (56), under "U.S. Patent Documents", in column 2, line 1, after "Elliot et al." insert -- 370/249 --.

On cover page, item (56), under "U.S. Patent Documents", in column 2, line 12, after "Ishikawa et al." insert -- 380/030 --.

On cover page, item (56), under "U.S. Patent Documents", in column 2, line 14, after "Oyama et al." insert -- 370/389 --.

On cover page, item (56), under "U.S. Patent Documents", in column 2, line 15, after "Werber et al." insert -- 370/392 --.

On cover page, item (56), under "U.S. Patent Documents", in column 2, line 16, after "Tripathi et al." insert -- 370/351 --.

Signed and Sealed this

Eleventh Day of May, 2010

David J. Kappos
*Director of the United States Patent and Trademark Office*

In the drawing:

On sheet 5 of 6, in "Reference Numeral 204", in "Figure 4", line 2, delete "WITIHN" and insert -- WITHIN --, therefor.

In column 4, line 33, delete "(OSI))" and insert -- (OSI) --, therefor.

In column 4, line 54, delete "(OSD" and insert -- (OSI) --, therefor.